Patented Sept. 25, 1934

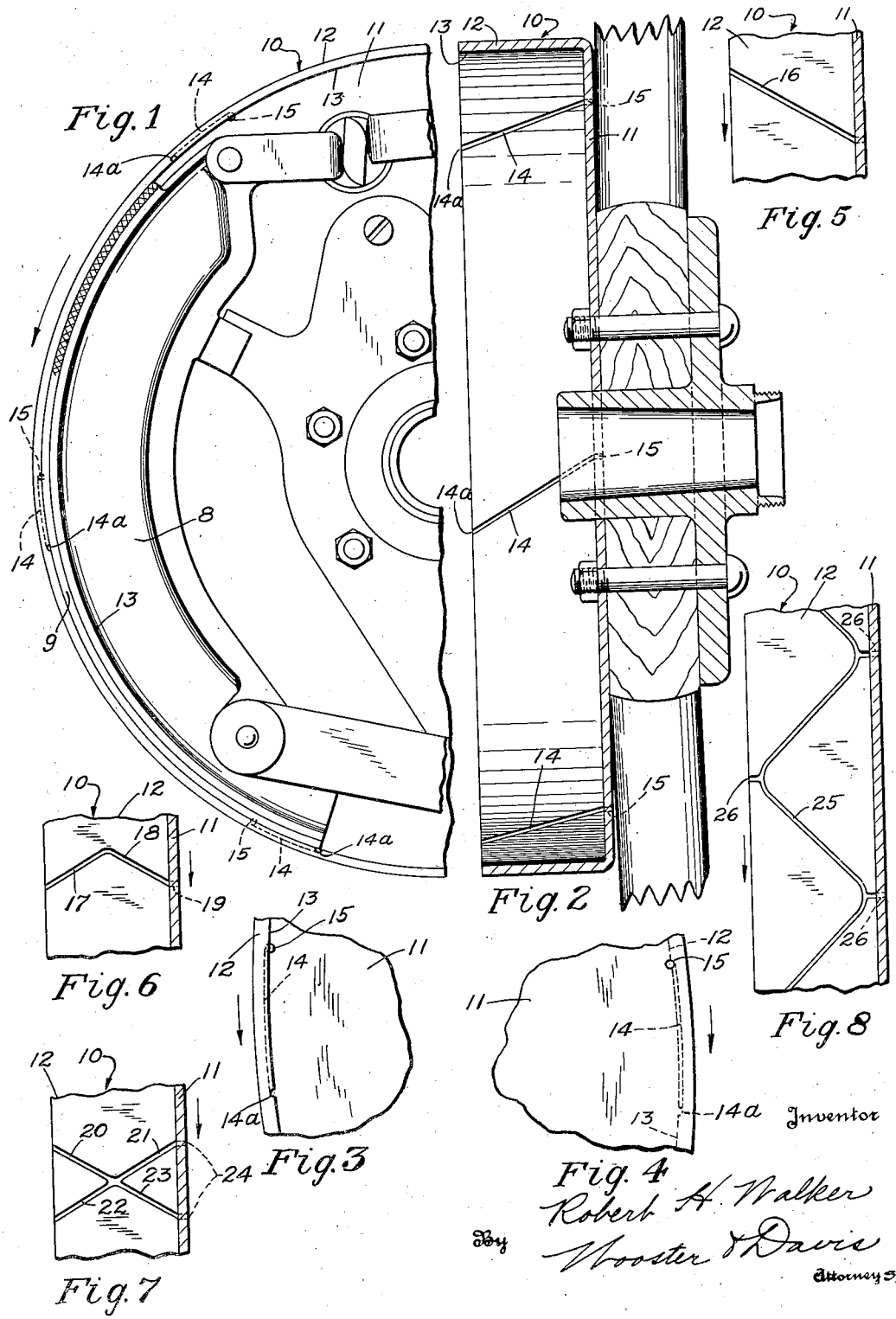

1,974,905

UNITED STATES PATENT OFFICE 1,974,905

BRAKE DRUM

Robert H. Walker, Bridgeport, Conn., assignor to Raybestos-Manhattan, Incorporated, Passaic, N. J., a corporation of New Jersey Application July 30, 1932, Serial No. 626,302

10 Claims. (Cl. 188—218)

This invention relates to new and useful improvements in brake drums, and has for an object to provide a brake drum including means to prevent or greatly reduce the tendency to score the brake drum, particularly on the substantially complete application of the brakes of a vehicle when the vehicle is traveling at high speed. It is especially applicable to steel drums to eliminate scoring.

Another object is to provide a brake drum having the means stated and wherein said means serves also to increase the speed of recovery of vehicle brakes from the effects of water.

Other objects and advantages will become apparent from a consideration of the following detailed description, taken in connection with the accompanying drawing, wherein several satisfactory embodiments of the invention are shown. However, it will be understood that the invention is not limited to the details disclosed but includes all such variations and modifications as fall within the spirit of the invention and the scope of the appended claims.

In the drawing:

Fig. 1 is a side elevational view showing a portion of a vehicle brake, the drum of which is constructed in accordance with the present invention;

Fig. 2 is a vertical sectional view through said brake, the same being shown in position on a vehicle wheel, and the brake band and its operating means being omitted;

Fig. 3 is a detail side elevational view showing a portion of the improved brake drum, the view being taken looking from the open side of the drum;

Fig. 4 is a similar view looking from the closed or web side of the drum;

Fig. 5 is a detail view illustrating a slight modification;

Fig. 6 is a similar view illustrating another modification;

Fig. 7 is a similar view illustrating a further modification; and

Fig. 8 is a somewhat larger but similar view illustrating another modification.

With automobile brakes, as at present constructed, particularly those employing steel brake drums, the drums are likely to be practically ruined or the brake bands substantially destroyed on the brakes being fully applied to suddenly stop an automobile, when the latter is traveling at a high rate of speed. This destructive action is abrasive and occurs owing to the action of the lining pulling up a small piece of the surface of the drum which in turn digs into the lining with the effect that more and more is pulled off scoring the drum and destroying the lining. This appears to be caused by collection of saturant that comes out of the lining due to bleeding and sweating, together with abraded material from both the drum and lining collecting on the surface of the lining.

The present invention comprehends the providing of means whereby such distillate or saturant and abraded material or other particles may be removed from the brake band and thrown out from between the adjacent or braking surfaces of the brake band and drum. This means, as herein disclosed, takes the form of grooves provided in and spaced about the brake drum in its braking surface. These grooves are arranged at an incline to the edges of the drum and form receptacles to collect the abrasive particles above referred to, and also form receptacles for water, should the brake bands become wet. These grooves can be relatively widely spaced and are narrow. They therefore do not reduce the friction surface of the drum nor do they form relatively narrow ridges to dig into the lining. In the following description, the action of these grooves will be further referred to and will be made more clear.

Referring in detail to the drawing, the reference character 10 indicates in its entirety a brake drum constructed in accordance with the present invention and this drum includes a web portion 11 and the usual flanged portion 12, the latter being open at its edge opposite the said web portion. Any suitable type of brake including a shoe 8 carrying a lining 9 of any usual construction such as a molded lining of asbestos fibre and a suitable binder are shown. It will also be understood that when in use the open side of the drum is covered by the usual cover plate, not shown. With particular relation to the form of the invention shown in Figs. 1–4, it will be noted that the brake drum 10 is in its braking surface 13, which is the inner surface of the flange 12, provided with a series of inclined grooves 14, the said grooves being spaced about said braking surface.

These grooves 14 may be formed in any desired manner as by being cut, pressed or cast into the brake drum, and the grooves are preferably about one-sixteenth of an inch wide. They therefore do not materially reduce the friction surface of the drum. In other words they are only of sufficient width to clear the surfaces of the drum and lining of the saturant, abraded material and water. While I do not wish to be limited to the number of grooves to be employed, I have found that in a fifteen inch drum, six equally spaced grooves of approximately one-sixteenth inch width are very effective for the purpose at hand.

Each groove is open at, at least, one end and as here disclosed the grooves are open at each of their ends, the opening at one end of each groove being through the web 11 of the brake drum as at 15, and at the other end through the open edge of the drum at 14a. It will be noted that the grooves are inclined with respect to the edges of the flange 12 of the drum, and when the grooves are open only at one end, the said open end should be disposed forwardly in the direction of rotation of the drum, while the latter is in use. In this connection, it will be noted in Fig. 2 that the drum 10 is shown as applied to the right rear wheel of an automobile. This arrangement is desired since any abrasive particles or any water collected in the grooves will tend to be thrown out through the open ends of the latter by centrifugal action in the usual rotation of the drum with its wheel. Where the groove is open at both ends, it will of course be understood that one open end of the groove would be forward in either direction of rotation of the drum.

As above suggested, these grooves increase the speed of recovery of the brake from the effects of water. Water from the brake band will be caught or picked up by the grooves and pushed out or escape through their open end. Since the grooves are inclined in the manner above mentioned, the water will be thrown out by the lateral or horizontal component of the centrifugal action against the walls of the grooves. The grooves also will pick up particles of dust or abrasive material or the like and this latter will also tend to be thrown out by centrifugal action and loading of the brake band or lining with particles will be prevented.

Under actual tests it has been ascertained that a brake drum constructed as herein disclosed will remain in good useful condition, and not show any scoring after a car has been suddenly stopped a large number of times, the car in each instance being stopped from an excessive rate of speed. On the completion of these tests, not only did the brake drum fail to show appreciable scoring, but the brake linings also remained in good usable condition. Many repetitions of the tests described above with drums of the conventional type never failed to cause scoring.

In Fig. 5, the flange portion 12 of the brake drum 10 is shown as provided with a groove 16 in its braking surface, the said groove being arranged at an incline opposite to the direction of inclination of the grooves 14 in Figs. 1–4. If these grooves are open only at their outer ends this arrangement may be provided in a brake drum for use on a wheel at the side of the vehicle opposite to that side to which the drum of Figs. 1–4 is applied if the grooves in that drum are open only at their outer ends. As mentioned above if the grooves are open at both ends then the drum could be used on wheels rotating in either direction.

Referring now to Fig. 6, the brake drum 10 is shown as provided with a groove substantially in the form of a herring-bone and including arms 17 and 18 arranged at an incline to one another and communicating inwardly of the edges of the flange portion 12 of the drum. The arm 17 of this groove extends through the open edge of said brake drum while the arm 18 includes an opening 19 through the web of the drum.

With this arrangement the groove should be open at both ends and the brake drum should be revolved in a direction that the ends of the grooves are forwardly in the direction of rotation. With this arrangement abrasive particles, water and the like, will tend to be thrown outwardly through the arms of the groove by centrifugal action. It will be appreciated that the groove shown in Fig. 6 will be repeated the desired number of times about the braking surface of the drum, it being understood that such grooves are not arranged close together, but are spaced substantial distances apart, so that a relatively few grooves are employed about the braking surface of the drum.

In Fig. 7, the brake drum 10 is shown as provided with grooves so arranged as to make multiples of those shown in Fig. 6. That is, in Fig. 7 the groove includes a double herring-bone effect formed by the arms 20 and 21 and the arms 22 and 23. The pair of arms 20 and 21 are arranged in reverse relation to the arms 22 and 23, and the pairs of arms communicate at their apexes at a point between the edges of the flange of the drum. It will be noted that the arms 20 and 22 of the groove open through the free edge of the flange 12 of the brake drum, while the arms 21 and 23 include openings 24 through the web of the drum. With this arrangement the grooves will act to collect abrasive particles, water and the like, and expel the same by centrifugal action, irrespective of the direction in which the drum is rotated.

Fig. 8 shows yet another modified arrangement and here the groove 25 is arranged in zigzag or spiral fashion extending from a point adjacent one edge of the flange of the drum 10 to a point adjacent the other edge thereof, and then backwardly, the said groove being continuous. From each high point of the groove 25, a small channel 26 is extended through the edge of the drum, the said channels alternately extending through the web portion of the drum. Since the adjacent zigzag portions of the groove 25 extend in opposite directions, the drum equipped with this groove may be rotated in either direction and will yet give the desired effect, since any abrasive particles, water or the like, will be thrown outwardly through one set or the other of the channels 26.

Having thus set forth the nature of my invention, what I claim is:

1. A brake including a drum having a plurality of narrow widely spaced grooves in its braking surface, said grooves arranged at an incline to the edges of the brake drum, said grooves each having one end opening through an edge of the drum, and a fibre lining mounted for movement to and from the braking surface.

2. A brake including a drum having a plurality of narrow widely spaced grooves in its braking surface arranged at substantially equal distances apart about said surface, said grooves arranged at an incline to an edge of the brake drum, said grooves each having one end opening through an edge of the brake drum, and a fibre lining mounted for movement to and from the braking surface.

3. A brake including a drum having a plurality of narrow widely spaced grooves in its braking surface, said grooves arranged at an incline to the edges of the brake drum and extending across the latter from one edge to the other thereof and open at each of their ends, and a fibre lining mounted for movement to and from the braking surface.

4. A brake including a drum having a plurality of narrow widely spaced grooves in its braking surface, said grooves arranged at an incline to the edges of the brake drum and extending across the same from one edge to the other thereof, said grooves each having one end opening through an edge of the drum, and a fibre lining mounted for movement to and from the braking surface.

5. A brake including a drum having a plurality of narrow widely spaced grooves in its braking surface, said grooves arranged at an incline to the edges of the brake drum, said grooves each having one end opening through an edge of the drum and arranged with their open ends disposed forwardly in the direction of rotation of the brake drum, and a fibre lining mounted for movement to and from the braking surface.

6. A brake including a drum having a plurality of narrow widely spaced grooves in its braking surface, said grooves each including a pair of arms inclining toward one another from opposite edges of the brake drum and connected at a point between the edges of the latter, said grooves being open at the outer ends of each of said arms, and a fibre lining mounted for movement to and from the braking surface.

7. A brake including a drum having a plurality of narrow widely spaced grooves in its braking surface, said grooves each including a pair of arms inclining toward one another from opposite edges of the brake drum and connected at a point between said edges, said grooves open at the outer ends of each of said arms and arranged about said surface in pairs with the grooves of each pair arranged opposite one another with their apex portions in communication, and a fibre lining mounted for movement to and from the braking surface.

8. A brake including a drum having a narrow groove in its braking surface, said groove zigzagging across said surface and extending about the same, said drum having channels communicating the high points of said groove with the adjacent edges of the drum, and a fibre lining mounted for movement to and from the braking surface.

9. A brake including a rotatable drum having a braking surface and a fibre friction lining mounted for movement to and from said surface, said drum being provided with means for preventing scoring of its braking surface by the fibre lining comprising a plurality of narrow, widely spaced grooves in said braking surface and extending in a direction transversely of this surface.

10. A brake including a rotatable drum having a braking surface and a fibre friction lining mounted for movement to and from said surface, said drum being provided with means for preventing scoring of its braking surface by the fibre lining comprising a plurality of narrow, widely spaced grooves in said braking surface and extending transversely thereof, and said drum also having outlet openings from the grooves to the outside of the drum.

ROBERT H. WALKER.